No. 749,128. PATENTED JAN. 5, 1904.
A. CASTLE.
STERILIZER.
APPLICATION FILED MAR. 18, 1903.

NO MODEL.

WITNESSES:
D. Gurnee
I. Butler

INVENTOR:
Arthur Castle
by Osgood & Davis
his Attys

No. 749,128. Patented January 5, 1904.

UNITED STATES PATENT OFFICE.

ARTHUR CASTLE, OF ROCHESTER, NEW YORK, ASSIGNOR TO WILMOT CASTLE COMPANY, OF ROCHESTER, NEW YORK, A CORPORATION OF NEW YORK.

STERILIZER.

SPECIFICATION forming part of Letters Patent No. 749,128, dated January 5, 1904.

Application filed March 18, 1903. Serial No. 148,331. (No model.)

*To all whom it may concern:*

Be it known that I, ARTHUR CASTLE, a citizen of the United States, and a resident of Rochester, in the county of Monroe and State of New York, have invented certain new and useful Improvements in Sterilizers, of which the following is a specification.

This invention relates to sterilizers; and the object of the invention is to produce a simple, convenient, and effective sterilizer and to improve the valve mechanism thereof, as hereinafter described.

Figure 1:
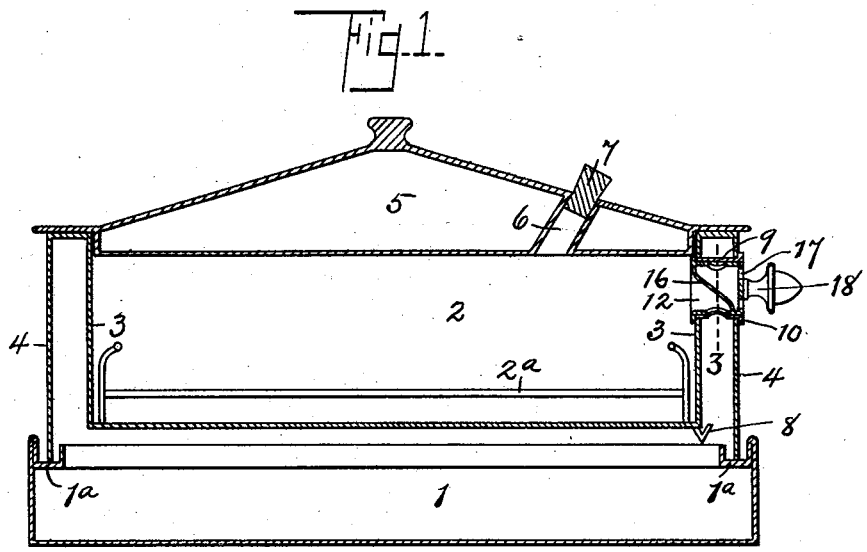
Figure 2:
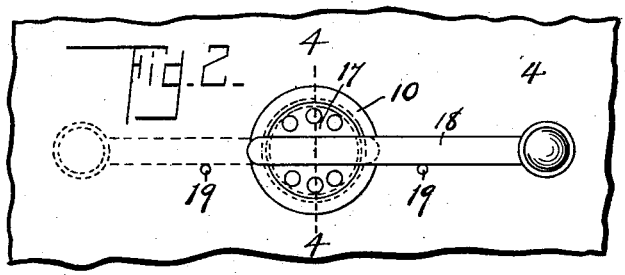
Figure 3:
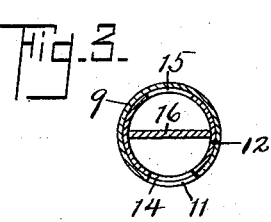
Figure 4:
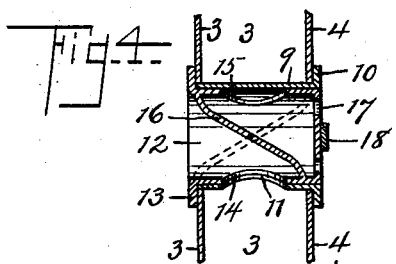

In the drawings, Figure 1 is a longitudinal vertical section of a sterilizer embodying this invention. Fig. 2 is a vertical end view of a portion of the sterilizer-case bearing the valve. Fig. 3 is a cross-section on the dotted line marked 3 in Fig. 1, and Fig. 4 is a cross-section on the line 4 4 of Fig. 2.

The device has a base 1, adapted to contain water, and is provided with a suitable supporting trough or ledge 1ª, preferably of such form as to contain water for sealing the connection between the base and the sterilizing-chamber or top. The sterilizing-chamber 2 is closed, except at the top, and is provided with double side walls 3 and 4, the space between which is closed at the top and is open at the bottom. The lower ledge of the outer wall 4 is adapted to set in the supporting-ledge 1ª. The sterilizing-chamber is adapted to contain the materials to be sterilized and may have a tray 2ª therein. A top 5 is provided which covers the sterilizing-chamber and preferably has an opening 6 through it from the inside of the chamber 2 to the outer air, which may be closed by a removable plug 7. The sterilizing-chamber is also provided at its bottom with a trap 8, which may be a bent tube, whereby the water that may condense in said chamber passes out of the bottom of the chamber and yet the chamber is sealed against the entrance of steam from the outside.

The device is adapted to be put upon a stove or other suitable heater, and water is placed in the base 1. As the water boils the steam completely surrounds the sterilizing-chamber 2 on its bottom and sides, passing into the space between the walls 3 and 4, and the chamber is thus thoroughly heated.

A valve mechanism is provided whereby the steam from the base may be led into the sterilizing-chamber or the steam-supply to the interior of sterilizing-chamber may be cut off therefrom and whereby also the steam-space outside of the sterilizing-chamber may be connected to the outer air. The form of this valve composing this invention is shown most clearly in Figs. 2, 3, and 4. The tube 9, having a flange 10 at one end and a perforation 11 upon its side, is set into the outside wall 4, so as to traverse the space between the walls 3 and 4, with the perforation 11 between said walls. Within the tube 9 is another tube 12, having a flange 13 on its end and two perforations 14 and 15, each adapted to register with the perforation 11. Inside this tube is a diagonal diaphragm 16, adapted to cut off that portion of the tube 12 containing the perforation 14 from that portion of the said tube containing the perforation 15. The tube 12 fits in the tube 9, with its flange 13 resting against the inner end of the tube 9 and preferably against the inner face of the wall 3. The tube 9 is preferably soldered to the outer wall 4 and to the inner wall 3. The tube 12 is adapted to revolve in the tube 9. The outer end of the tube 12 may, if desired, have a perforated cap 17, and said tube 12 is provided with a handle 18, whereby the said tube is rotated. Stops 19 19 are put upon the outer wall 4 to limit the movement of the handle 18, and therefore to determine the setting of the valve. It will now be seen most clearly from Fig. 4 that if the tube 12 is turned so that its perforation 14 registers with the perforation 11 in the tube 9 the steam-space is connected with the interior of the sterilizing-chamber and communication of the steam-space with the outer air is cut off; but if the handle 18 is turned so that the parts take the position shown by dotted lines in Figs. 2 and 4 the sterilizing-chamber 2 is cut off from the steam-space and from the outer air and the steam-space is connected with the outer air. If it is deemed desirable, the handle 18 may be set half-way between the two positions just described, in which case the steam-space and the sterilizing-chamber are both cut off from each other and from the outer air. By this means the sterilizing operation may be performed properly. The handle and parts being in the position shown in the full lines in Figs. 1, 2, and 4, the steam is led from the boiling water in the base into the interior of the sterilizing-chamber 2, and this connection is maintained until the articles to be sterilized have been steamed sufficiently. Then the valve is turned into the position shown in dotted lines in Figs. 2 and 4, and the steam heat will dry the materials in the sterilizing-chamber. The plug 7 may be removed in order to permit the proper escape of the vapor. Meanwhile the steam that is being made in the base 1 passes off to the outer air through the perforated cap 17 of the valve. The valve is very simple, cheap, and easy to manufacture and to assemble with the remainder of the apparatus. Perforations are made in the inner and outer walls 3 and 4, and the tube 9, fitting said perforations, is soldered in place. The tube 12, with its flange 13, diaphragm 16, and, if preferred, its end cap 17, is then slipped into the tube 9 from the inside of the chamber, and the handle 18 is soldered or otherwise fastened to the outer end of said tube 12. Portions of the handle rest upon the outer end of the tube 9—as, for instance, on the flange 10 thereof—and thus all the parts are held together.

What I claim is—

1. In a sterilizing apparatus, a sterilizing-chamber having double walls for a steam-space, a valve through said walls consisting of an outer tube fastened in said walls and having a perforation connecting with the steam-space, an inner tube open at both ends and having two perforations adapted to register with the perforation in the first-mentioned tube, a diaphragm in the inner tube separating said tube into two parts each connected with one only of the perforations therein, and means for retaining the inner tube in the outer tube, whereby when the inner tube is rotated the steam-space is connected either with the sterilizing-chamber or with the outer air.

2. In a sterilizing apparatus, a sterilizing-chamber having double walls for a steam-space, a valve through said walls consisting of an outer tube fastened in said walls and having a perforation connecting with the steam-space, an inner tube open at both ends and having an end flange and two perforations adapted to register with the perforation in the first-mentioned tube, a diaphragm in the inner tube separating said tube into two parts each connected with one only of the perforations therein, a handle fastened to the inner tube for retaining the inner tube in the outer tube, whereby when the inner tube is rotated the steam-space is connected either with the sterilizing-chamber or with the outer air.

3. In a sterilizing apparatus, a sterilizing-chamber having double walls for a steam-space, a valve through said walls consisting of an outer tube fastened to said walls and having a perforation connecting with the steam-space and an end flange, an inner tube open at both ends and having two perforations adapted to register with the perforation in the first-mentioned tube and an end flange, a diagonal diaphragm in the inner tube separating said tube into two parts each connected with one only of the perforations therein, and means for retaining the inner tube in the outer tube, whereby when the inner tube is rotated the steam-space is connected either with the sterilizing-chamber or with the outer air.

4. In a sterilizing apparatus, a sterilizing-chamber having double walls for a steam-space, a valve through said walls consisting of an outer tube fastened to said walls and having a perforation connecting with the steam-space and an end flange, an inner tube open at both ends and having two perforations adapted to register with the perforation in the first-mentioned tube, and an end flange, a diaphragm in the inner tube separating said tube into two parts each connected with one only of the perforations therein, and a handle fastened to the end of said inner tube for rotating it and for retaining it in the outer tube, whereby when the inner tube is rotated the steam-space is connected either with the sterilizing-chamber or with the outer air.

ARTHUR CASTLE.

Witnesses:
  D. GURNEE,
  I. BUTLER.